US012810194B2

(12) United States Patent
Saravanan et al.

(10) Patent No.: US 12,810,194 B2
(45) Date of Patent: Nov. 24, 2026

(54) DETERMINING ALLOCATION OF RESOURCES IN A WIRELESS NETWORK

(71) Applicant: Telefonaktiebolaget LM Ericsson (publ), Stockholm (SE)

(72) Inventors: M Saravanan, Chennai (IN); Ahsan Javed Awan, Vallentuna (SE); K M Bharathvaj, Chennai (IN)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 740 days.

(21) Appl. No.: 18/258,283

(22) PCT Filed: Dec. 21, 2020

(86) PCT No.: PCT/EP2020/087517

§ 371 (c)(1),
(2) Date: Jun. 19, 2023

(87) PCT Pub. No.: WO2022/135675

PCT Pub. Date: Jun. 30, 2022

(65) Prior Publication Data

US 2024/0054382 A1 Feb. 15, 2024

(51) Int. Cl.
*H04W 72/04* (2023.01)
*G06N 10/60* (2022.01)

(52) U.S. Cl.
CPC ............ *G06N 10/60* (2022.01); *H04W 72/04* (2013.01)

(58) Field of Classification Search
CPC ......... G06N 10/60; G06N 5/01; H04W 72/04; H04W 72/121
See application file for complete search history.

(56) References Cited

U.S. PATENT DOCUMENTS 8,374,137 B2 * 2/2013 Hui ........................ H04W 72/52 370/468
10,467,543 B2 * 11/2019 Macready .............. B82Y 10/00
10,713,582 B2 * 7/2020 Dadashikelayeh ....... G06F 8/30
2012/0045136 A1 * 2/2012 Rose ...................... B82Y 10/00 382/209

(Continued)

FOREIGN PATENT DOCUMENTS

WO WO-2020227721 A1 * 11/2020 ........... H04L 1/0054

OTHER PUBLICATIONS

ArXiv: 1811.11538 Tutorial on formulating and using QUBO Models (Year: 2019).*

(Continued)

*Primary Examiner* — Yuwen Pan
*Assistant Examiner* — Mario R Campero Miramontes
(74) *Attorney, Agent, or Firm* — Weisberg I.P. Law, P.A.

(57) ABSTRACT

Methods and apparatus are provided. In an example aspect, a method of determining allocation of resources in a wireless network is provided. The method includes expressing determination of allocation of resources for a plurality of wireless communication devices in the wireless network as a quadratic unconstrained binary optimization (QUBO) problem, and executing the QUBO problem on a quantum computing device to determine the allocation of resources to the plurality of wireless communication devices in the wireless network.

20 Claims, 5 Drawing Sheets

(56) References Cited

U.S. PATENT DOCUMENTS

2015/0205759 A1* 7/2015 Israel ...................... G06F 17/11
703/2
2020/0351927 A1* 11/2020 Davydov .......... H04W 72/1273

OTHER PUBLICATIONS

Kim et al. (arXiv:2001.04014v1), Leveraging Quantum Annealing for Large MIMO Processing in Centralized Radio Access Networks, 2020 (Year: 2020).*
Kizilirmak (DOI: 10.1109/CSNDSP49049.2020.9249501), Quantum Annealing Approach to NOMA Signal Detection, 2020. (Year: 2020).*
Hahn et al. (DOI: 10.1109/ICRC.2017.8123654), Reducing Binary Quadratic Forms for More Scalable Quantum Annealing, 2017. (Year: 2017).*
Kim et al. (arXiv:2010.00682v1), Towards Hybrid Classical-Quantum Computation Structures in Wirelessly-Networked Systems, 2020. (Year: 2020).*
A Tutorial on Formulating and Using QUBO Models (arxiv:1811.11538) Glover et al. (Year: 2019).*
Kim et al. (arXiv:2001.04014v1), Leveraging Quantum Annealing for Large MIMO Processing in Centralized Radio Access Networks, 2020 (Year: 2020) (Year: 2020).*
Hahn et al (DOI: 10.1109/ICRC.2019.8914719 ), Optimizing the spin reversal transform on the D-Wave 2000Q, 2019 (Year: 2019).*
Kizilirmak (DOI: 10.1109/CSNDSP49049.2020.9249501), Quantum Annealing Approach to NOMA Signal Detection, 2020. (Year: 2020) (Year: 2020).*
Hahn et al. (DOI: 10.1109/ICRC.2017.8123654), Reducing Binary Quadratic Forms for More Scalable Quantum Annealing, 2017. (Year: 2017) (Year: 2017).*
Kim et al. (arXiv:2010.00682v1), Towards Hybrid Classical-Quantum Computation Structures in Wirelessly-Networked Systems, 2020. (Year: 2020) (Year: 2020).*
International Search Report and Written Opinion dated Oct. 8, 2021 for International Application No. PCT/EP2020/087517 filed Dec. 21, 2020, consisting of 9-pages.
T. T. Tran et al.; A Hybrid Quantum-Classical Approach to Solving Scheduling Problems; Proceedings of the Ninth International Symposium on Combinatorial Search (SoCS 2016); Jun. 20, 2016, consisting of 9-pages.
Z. Naghsh et al.; Digitally Annealed Solution for the Maximum Clique Problem with Critical Application in Cellular V2X; 2019 IEEE International Conference on Communications (ICC); IEEE; May 20, 2019, consisting of 7-pages.

* cited by examiner

100

120

DETERMINING ALLOCATION OF RESOURCES IN A WIRELESS NETWORK

CROSS-REFERENCE TO RELATED APPLICATION

This application is a Submission Under 35 U.S.C. § 371 for U.S. National Stage Patent Application of International Application Number: PCT/EP2020/087517, filed Dec. 21, 2020 entitled "DETERMINING ALLOCATION OF RESOURCES IN A WIRELESS NETWORK," the entirety of which is incorporated herein by reference.

TECHNICAL FIELD

Examples of the present disclosure relate to determining allocation of resources in a wireless network, for example using a method that uses a quantum computing device.

BACKGROUND

In some wireless communication systems and wireless networks, wireless resources may be allocated to one or more wireless communication devices in the network. The main goal of resource allocation is to optimally assign the limited radio resource blocks (RBs) to the wireless communication devices within the coverage region of the wireless network. Allocation of the resources may be determined based on the channel quality experienced by the wireless communication devices such that it satisfies all given constraints and also maximizes the sum of user perceived valuations as a whole.

Attempts to solve this resource allocation problem have included conversion of the problem to a combinatorial optimization problem and then solving it using classical methods. As it is an NP-hard problem in terms of computational complexity, only approximate classical algorithms exist that are also computationally expensive. Furthermore, in some wireless networks, resource blocks have to be reassigned at the beginning of each Transmission Time Interval (TTI), which is usually in milliseconds, and so there is a need to perform this optimal allocation repeatedly in a rapid manner.

SUMMARY

Prior resource allocation problems such as those described above are NP-hard problems that may require considerable computing resources to find an optimal solution. Therefore, a way of speeding up the solution of a resource allocation problem is desired. For example, embodiments of this disclosure may employ quantum computing to more quickly obtain a solution to the resource allocation problem.

One aspect of the present disclosure provides a method of determining allocation of resources in a wireless network. The method comprises expressing determination of allocation of resources for a plurality of wireless communication devices in the wireless network as a quadratic unconstrained binary optimization (QUBO) problem. The method also comprises executing the QUBO problem on a quantum computing device to determine the allocation of resources to the plurality of wireless communication devices in the wireless network.

Another aspect of the present disclosure provides apparatus for determining allocation of resources in a wireless network. The apparatus comprises a processor and a memory. The memory contains instructions executable by the processor such that the apparatus is operable to express determination of allocation of resources for a plurality of wireless communication devices in the wireless network as a quadratic unconstrained binary optimization (QUBO) problem, and execute the QUBO problem on a quantum computing device to determine the allocation of resources to the plurality of wireless communication devices in the wireless network.

A further aspect of the present disclosure provides apparatus for determining allocation of resources in a wireless network. The apparatus is configured to express determination of allocation of resources for a plurality of wireless communication devices in the wireless network as a quadratic unconstrained binary optimization (QUBO) problem, and execute the QUBO problem on a quantum computing device to determine the allocation of resources to the plurality of wireless communication devices in the wireless network.

Advantages to embodiments of this disclosure may include a considerable increase in the speed of finding a solution, such as an optimal solution, to the resource allocation problem. In addition, conversion of the problem to a QUBO problem can in some examples be easily generalized to add more constraints. Examples of this disclosure can be applied to Social Internet of Things (SIOT) technologies to optimize any IOT networks relate to computationally intensive problems. Examples of this disclosure may use OFDMA inputs for model formulation, though this can be extended to MIMO inputs in other examples.

BRIEF DESCRIPTION OF THE FIGURES

For a better understanding of examples of the present disclosure, and to show more clearly how the examples may be carried into effect, reference will now be made, by way of example only, to the following Figures in which.

DETAILED DESCRIPTION

Figure 1A:
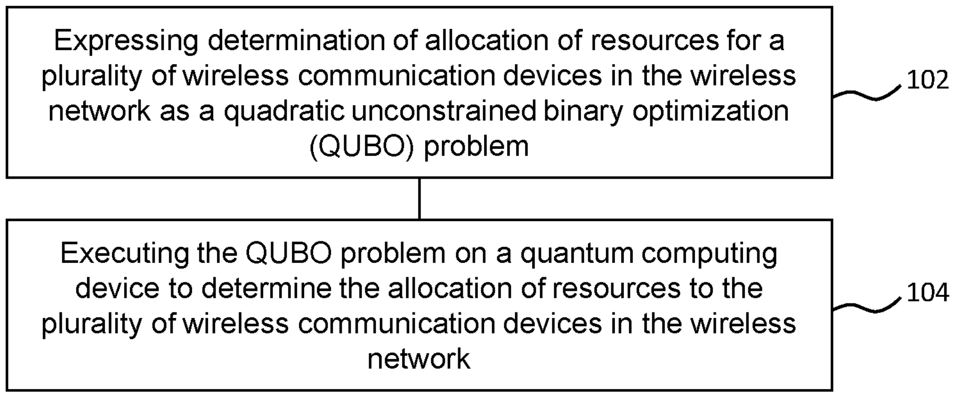
FIG. 1A is a flow chart of an example of a method of determining allocation of resources in a wireless network.

The following sets forth specific details, such as particular embodiments or examples for purposes of explanation and not limitation. It will be appreciated by one skilled in the art that other examples may be employed apart from these specific details. In some instances, detailed descriptions of well-known methods, nodes, interfaces, circuits, and devices are omitted so as not obscure the description with unnecessary detail. Those skilled in the art will appreciate that the functions described may be implemented in one or more nodes using hardware circuitry (e.g., analog and/or discrete logic gates interconnected to perform a specialized function, ASICs, PLAs, etc.) and/or using software programs and data in conjunction with one or more digital microprocessors or general purpose computers. Nodes that communicate using the air interface also have suitable radio communications circuitry. Moreover, where appropriate the technology can additionally be considered to be embodied entirely within any form of computer-readable memory, such as solid-state memory, magnetic disk, or optical disk containing an appropriate set of computer instructions that would cause a processor to carry out the techniques described herein.

Hardware implementation may include or encompass, without limitation, digital signal processor (DSP) hardware, a reduced instruction set processor, hardware (e.g., digital or analogue) circuitry including but not limited to application specific integrated circuit(s) (ASIC) and/or field programmable gate array(s) (FPGA(s)), and (where appropriate) state machines capable of performing such functions.

Example embodiments of this disclosure may provide an approach for solving the above-described resource allocation problem by converting the problem to or expressing the problem as a Quadratic Unconstrained Binary Optimization (QUBO) problem. This QUBO problem may then for example be solved using a quantum annealer, which works based on quantum mechanical phenomena such as superposition, entanglement and quantum tunneling.

In a cellular network, such as a Fourth Generation (4G)/Long-Term Evolution (LTE), Fifth Generation (5G)/New Radio (NR) or other type of cellular network, communication may occur in a cell where a central Base Station (BS) communicates with one or more active wireless devices, also referred to as Mobile Stations (MSs), after the process of allocation of radio resource units. The radio spectrum is a finite resource, which means there is a need for an optimal and effective allocation of radio resources in the time-frequency domain. In the frequency domain, the available bandwidth for the cell is divided into smaller chunks comprised of multiple subcarriers, whereas in the time domain a frame-based division is defined which is composed of many sub-frames with each time length equivalent to one TTI. The minimum resource allocation unit that can be assigned is called a Scheduling Unit (SU) and the base station schedules units of time-frequency resources (e.g. one or more subcarriers and one or more subframes) among the active devices within the cell once per TTI, usually at the beginning of the interval.

In an example downlink transmission, the following two assumptions are made: (i) The base station always has data to transmit to one or more wireless communication devices (also referred to herein as User Equipments, UEs); and (ii) Data that is to be sent to the wireless communication device(s) are organized in packets before being sent. Each wireless communication device experiences different signal-to-noise ratio (SNR) on each resource unit, where the signal-to-noise ratio is defined as the ratio of signal power to noise power. Therefore, in some examples, fine granularity for allocation of resources may be based on channel quality experienced by the wireless communication devices, which may be represented for example using Channel Quality Indicator (CQI), indicating the quality of the communication channel between the device and the base station. A CQI value obtained for a wireless communication device may in some examples be mapped to a Modulation and Coding Scheme (MCS) index which defines a code rate and a modulation scheme for communication between the base station and the device. The MCS defines how many useful bits can be transmitted per resource element, and depends on the channel quality. If the link has better quality, then the MCS index will be higher and so more useful data can be transmitted (e.g. the data can be transmitted at a higher rate as compared to a lower MCS index).

Wireless network technologies such as LTE and 5G use high-performance radio spectrum access method called Orthogonal Frequency-Division Multiple Access (OFDMA) for the downlink, which is capable of providing higher spectral efficiency by taking full advantage of the frequency and time diversity of the radio channel. Another method called Multiple-Input and Multiple-Output (MIMO) is also employed by these wireless networks for data rate enhancement by increasing the capacity of a radio link using multiple transmission and receiving antennas to exploit multipath propagation. However, these schemes may not be sufficient to satisfy the requirements of the wireless communication devices. For example, the way in which resources are allocated may influence the performance and quality of a wireless network significantly.

The discovery of quantum computers has revolutionized the way in which certain problems may be solved, in particular those problems that belong to the class of NP-hard. In particular, a metaheuristic procedure called quantum annealing has been found to be very effective in solving combinatorial optimization problems, where the goal is to find a particular combination of arguments or variables among many possible combinations that results in a global extremum of a function. If an optimization problem such as the optimal way to allocate resources in a wireless network can be framed as an energy minimization problem, then the quantum annealing process can be used for example to find the low-energy states of the problem and hence the optimal or near-optimal combination of variables by exploiting the effects of quantum physics. Example embodiments of this disclosure use this approach.

For a quantum system, a Hamiltonian is a function which maps certain states, called eigenstates, to the corresponding eigen energies, and the collection of these make up the eigen spectrum. This Hamiltonian can be viewed as the sum of two terms: (i) initial Hamiltonian whose lowest-energy state is when all the qubits are in a superposition state of 0 and 1; and (ii) final Hamiltonian or problem Hamiltonian whose lowest-energy state is the solution to the problem that we are trying to solve. In quantum annealing, we begin in the lowest-energy eigenstate of the initial Hamiltonian. In the annealing process, we gradually increase the influence of the problem Hamiltonian, which contains the qubit biases and coupling strengths between qubits, and we gradually decrease the influence of the initial Hamiltonian and at the end of it, we will be in the eigenstate of the problem Hamiltonian. Ideally, we have stayed in the minimum energy state throughout the quantum annealing process so that, by the end of the process, we are in the minimum energy state of the problem Hamiltonian and therefore have a solution to the problem we want to solve. In some examples, by the end of the quantum annealing process, each qubit is a classical object.

In examples of this disclosure, the resource allocation problem for allocating resources in a wireless network is presented as a combinatorial optimization problem, and then transformed to a quadratic unconstrained binary optimization (QUBO) problem that can be naturally embedded on and solved directly by a quantum computing device such as a quantum annealing device. A QUBO problem is defined for example using an upper triangular matrix Q of size N×N with N being the number of logical qubits and a binary vector $x=(x_1, x_2, \ldots, x_N)T$, as minimizing the following energy function E:

$$E(Q,x)=E_i Q_{i,i} x_i + \Sigma_{i<j} Q_{i,j} x_i x_j \quad (1)$$

where $x_i \in \{0, 1\}$ and $Q_{ij} \in \mathbb{R}$ i,j=1, 2, . . . ,N. Each output decision variable $x_i$ represents the measured value (classical) of a logical qubit. The main diagonal elements $Q_{ii}$ of the matrix Q are the linear coefficients in the function E which represents the qubit biases, and the off-diagonal elements $Q_{ij}$ of the matrix Q are the quadratic coefficients in the function E which represents the coupling strengths between neighboring qubits. Note that, $$x_i^2 = x_i$$

as $x_i \in \{0, 1\}$.

This can be expressed more concisely in some examples as:

$$\min_{x \in \{0,1\}^N} x^T Q x \quad (2)$$

Mapping an optimization problem into the QUBO format in some examples may involve calculating the appropriate values of all the elements of the matrix Q such that a solution vector x that minimizes E will represent an optimal solution to the original non-QUBO optimization problem formulation, e.g. the problem of optimal or near-optimal allocation of resources in a wireless network.

Prior resource allocation problems such as those described above are NP-hard problems that may require considerable computing resources to find an optimal solution. Therefore, a way of speeding up the solution of a resource allocation problem is desired. For example, embodiments of this disclosure may employ quantum computing to more quickly obtain a solution to the resource allocation problem. Advantages to embodiments of this disclosure may include a considerable increase in the speed of finding a solution, such as an optimal solution, to the resource allocation problem. In addition, conversion of the problem to a QUBO problem can in some examples be easily generalized to add more constraints. Examples of this disclosure can be applied to Social Internet of Things (SIOT) technologies to optimize any IOT networks relate to computationally intensive problems. Examples of this disclosure may use OFDMA inputs for model formulation, though this can be extended to MIMO inputs in other examples.

FIG. 1 is a flow chart of an example of a method 100 of determining allocation of resources in a wireless network. The method comprises, in step 102, expressing determination of allocation of resources for a plurality of wireless communication devices in the wireless network as a quadratic unconstrained binary optimization (QUBO) problem. Step 104 of the method 100 comprises executing the QUBO problem on a quantum computing device to determine the allocation of resources to the plurality of wireless communication devices in the wireless network. This may comprise for example performing a quantum annealing process.

The Quantum computing device may be for example a quantum annealer such as from D-Wave Systems Inc. An example of such a device is the D-Wave 2000Q, which may in some examples execute the QUBO problem. In other examples, the quantum computing device may be another type of quantum computing device. The quantum computing device may execute the QUBO problem in any suitable location, including for example local to the entity performing the method 100, at the same premises as the entity performing the method 100, or remote from the entity performing the method 100. In some examples, executing the QUBO problem on a quantum computing device may comprise sending instructions to the quantum computing device, which may be local or remote, to execute the QUBO problem.

A particular example of this method is now described. At the beginning of each transmission time interval (TTI), the resource allocation problem of how to allocate resources in a wireless network may be determined. This may comprise for example how to share available radio resources among active devices in order to maximize (or nearly maximize) a given objective function that quantifies a user perceived valuation of the quality of signal received at the mobile terminal. Furthermore, the allocation may be done in some examples such that it satisfies all given constraints, which depend on the technologies or methods that are used. It may be desirable to allocate all available resource units (e.g. in one TTI) one by one to the UEs with the best channel quality. However, this may conflict with the current 3GPP standards.

If we consider the Long-Term Evolution (LTE) networks, the 3GPP standard does not support multiple data rates (e.g. different MCSs) for each UE within one TTI in order to avoid excessive signaling overheads. In order to comply with the existing standards, the resource allocation algorithm should select, for each UE, a common MCS over all the resource units assigned to that UE in one TTI whenever a resource allocation decision is made. However, it may be possible for different UEs to use different MCSs.

In each transmission time interval, data to be transmitted are encapsulated in a transport block (TB) and the size of the TB in bits received by the UE is referred to as the Transport Block Size (TBS). This transport block size can be calculated in some examples using a function TBS(n,m), which returns the amount of data that can be sent from the BS to a UE by allocating n scheduling units to it and by assigning the MCS m, and determines the maximum amount of data that can be transmitted during a TTI to a particular UE using that number of scheduling units (also referred to herein as resource units). A scheduling unit (SU) is comprised of two consecutive resource blocks (RBs). In some examples, allocation of resources in a wireless network may comprise allocation of resource blocks or scheduling units to one or more wireless communication devices, for example in a certain time period such as one TTI. In other examples, allocation of resources may comprise allocation of time slots of other lengths to one or more wireless communication devices.

Consequently, the instantaneous data rate is denoted by:

$$R(n, m) = \frac{TBS(n, m)}{TTI},$$

where TT/refers to the length of the transmission time interval.

A basic constraint in examples of the resource allocation problem described herein is that each resource unit should be allocated to at most one UE. This constraint also ensures that not more than N scheduling units can be allocated where N is the total number of scheduling units available. There are also the following two constraints for OFDMA in LTE: a bit error rate (BER) constraint and a single MCS per device constraint.

The number of bit errors that occur in a unit time during the transmission determines the bit error rate. Depending on the radio channel quality of each user equipment, LTE dynamically adapts the MCS (e.g. between TTIs for one or more wireless communication devices) by selecting a spectrally efficient MCS for a mobile terminal, if that UE has a good SNR value on a given scheduling unit. Although it results in a higher instantaneous rate on that scheduling unit, it may also increase the bit error rate. A selected MCS should not cause the BER to cross a given threshold even though it is more spectrally efficient. The most efficient MCS that can be used by a UE u on scheduling unit k without breaking this BER constraint is referred to as $m_{u,k}$.

According to the current 3GPP standards for LTE, a BS can only transmit to a particular UE using a single MCS over all the resources assigned to the UE within one TTI. In other words, the MCS cannot be adapted to each scheduling unit within one TTI, which may otherwise maximize the capacity as expected in theoretic OFDMA-based systems. Consequently, the instantaneous data rate per resource unit has to be the same across all resource units allocated to a particular UE in one TTI. For simplicity, we can assume that each UE is constrained to use the MCS corresponding to its allocated scheduling unit(s) of the lowest quality (spectral efficiency) to meet an acceptable BER per scheduling unit, and this single MCS $m_u$ assigned to a UE u can be referred to as:

$$m_u = \min(m_{u,k} | u \in \mathcal{U}, k \in \mathcal{N}_u)$$

where $\mathcal{U}$ denotes the set of UEs and $\mathcal{N}_u$ denotes the set of scheduling units allocated to the UE u.

In some examples of this disclosure, to quantify the objective function, which is the problem of how to allocate (or how to determine allocation of) resources in a wireless network, we define a utility function $\varphi_u$ that measures the benefit of a solution, such as for example the UE perceived benefit. For that, we use two quantities: (i) Total number of scheduling units N and we denote the set containing these scheduling units as $\mathcal{N}=\{k_1, k_2, k_3, \ldots, k_N\}$ where a scheduling unit is represented using $k_j$, $j\in[1,N]$; and (ii) Total number of UEs U and we denote the set of UEs as $\mathcal{U}=\{u_1, u_2, u_3, \ldots, u_U\}$ where each UE is represented using $u_i$, $i\in[1, U]$. Further, for example in LTE, we denote the set containing MCSs as $\mathcal{M}=\{m_1, m_2, m_3, \ldots, m_M\}$ where M represents the total number of MCSs.

As there are N scheduling units available, a UE can be allocated with any one of the $2^N$ possible combinations where $2^N$ is the number of subsets possible for a set with cardinality N. Further, for example according to the LTE standard, each UE can use only one MCS among M available MCSs over all of the allocated resources and hence each UE can be assigned with any one of the M possible MCSs. With this, we define the utility function $\varphi_u$ as a function which maps the input from its domain $\mathbf{2}^N \times M$ to a utility value in its co-domain $R^+$. Further, the utility function p is a monotonically increasing function on both of its arguments. For simplicity, in this example, we consider the utility function as $\varphi_u(\mathcal{N}_u, m_u)=|\mathcal{N}_u|\times\text{index}(m_u)$ where $\mathcal{N}_u$ is the set of scheduling units allocated to the UE u and index($m_u$) is the maximum MCS index that can be used by UE u on $\mathcal{N}_u$. However, this can be extended to a large class of utility functions.

The objective is to maximize the sum of utility values of all the UEs by distributing the finite number of resources to the finite number of UEs. In other words, the aim is to find the disjoint allocated resource sets $\mathcal{N}_{u_1}, \mathcal{N}_{u_2}, \ldots, \mathcal{N}_{u_U}$ along with the associated MCS index $m_{u_1}, m_{u_2}, \ldots, m_{u_U}$ such that it maximizes $\sum_{u\in\mathcal{U}} \varphi_u(\mathcal{N}_u, m_u)$ under the given set of constraints provided a problem instance $\mathcal{I}=[m_{u,k}]_{u\in\mathcal{U},k\in\mathcal{N}}$ which is a matrix of size U×N is given as input.

The resulting resource allocation problem can be summarized as the following:

Inputs:

(i) Expression of the utility function $\varphi_u$ (ii) Problem instance, $$\mathcal{I} = \begin{bmatrix} m_{u_1,k_1} & \cdots & m_{u_1,k_N} \\ \vdots & \ddots & \vdots \\ m_{u_U,k_1} & \cdots & m_{u_U,k_N} \end{bmatrix}$$

Objective:

Maximize $\sum_{u\in\mathcal{U}} \varphi_u\,(k\in\mathcal{N}\,|\,b_{u,k}=1, m_u)$ (Sum of the utility values)

Subject to:

(i) $\Sigma_u b_{u,k} \le 1$, $\forall k\in\mathcal{N}$ (At most one UE per SU)

(ii) $m_u \le b_{u,k} \le m_{u,k}+(1-b_{u,k})m_M$, $\forall u$, $\forall k$ (Single MCS per UE)

where $b_{u,k}\in\{0, 1\}$, $\forall u$, $\forall k$ and $m_u \in \mathcal{M}$, $\forall u$.

Here, $b_U$,k is a binary variable which is set to 1 if the SU k is allocated to the UE u and otherwise set to 0.

Output: Optimal resource allocation.

Embodiments of this disclosure propose transforming the objective problem (and any constraints), for example in an Integer Linear Programming (ILP) form, into a QUBO problem. This type of problem is in a natural form for embedding into a Quantum Processing Unit (QPU) such as a quantum annealer. Therefore, the definition of variables for the QUBO may in some examples use classical pre-processing on some of the variables.

In the process of converting the classical problem (e.g. in ILP form) into QUBO form, in some examples, the following steps may be performed:

1. Convert the objective function and constraints into an expression containing only binary variables (e.g. where each binary variable is 0 or 1).
2. Transform the given constraints into an unconstrained equivalent form using appropriate quadratic penalty functions.
3. If there are any constraints present in the form of linear inequalities, we insert slack/surplus variables in the appropriate places to convert it to the general matrix equation form of Ax=b, where A is a matrix containing the coefficients of binary variables in the column vector x, and b is a column vector containing the constants in the system of linear equations. This Ax=b can be converted to an appropriate quadratic penalty by using the term $(Ax-b)^2$.
4. Combine the expressions of objective function and the penalty functions into a single quadratic expression equivalent to the form $x^TQx$.
5. Finally, determine the Q matrix from the quadratic expression in step 4. In some examples, the maximization problem may be converted into a minimization problem since the quantum annealer finds minima or ground energy of the energy function. This can be done by negating all the coefficients of the objective function.
6. The binary variables in the expression containing only binary variables in some examples represents the logical qubits in the problem graph. These may in some examples be mapped to an architecture called Chimera graph through the embedding process on a D-Wave quantum annealing device in particular implementations.

In particular examples, the following steps may be performed:

1. In the objective function $\varphi_u(\mathcal{N}_u, m_u)=|\mathcal{N}_u| \times \text{index}(m_u)$, the conversion of $|\mathcal{N}_u|$ and index($m_u$) into expressions containing only binary variables are as follows:
   a. Perform the mapping $b_{u_i,k_j} \rightarrow x_{N(i-1)+j}$, where $i \in [1, U]$ and $j \in [1,N]$ to obtain UN binary variables starting from $x_1$ to $x_{UN}$.
   b. $|\mathcal{N}_u|$ can be written as $\Sigma_k b_{u,k}$, $\forall u \in \mathcal{U}$.
   c. An integer variable a with known upper bound B and lower bound 0 (i.e., $0 \le a \le B$) can be expressed using $[\log_2 B]+1$ binary variables:

$$a = x_1 + 2x_2 + 4x_3 + \dots + 2^{\lfloor \log_2 B \rfloor} x_{\lfloor \log_2 B \rfloor + 1}$$

d. As the value of $m_M$ is known from the input which acts as upper bound and as the MCS index starts from 0, we can use the binary variables $x_i$, where $UN < i \le UN + U([\log_2 m_M]+1)$ to express each $m_u$ in a similar way as variable a in point c.
2. The constraints are transformed as follows:
   a. The constraint $\Sigma_u b_{u,k} < 1$, $\forall k \in \mathcal{N}$ can be transformed as:
      i. For a constraint in the form $x+y \le 1$, the equivalent penalty function is P(xy), where P is a positive scalar quantity which can be used to quantify the penalty. In an example, only when both x and y are equal to 1, the penalty function exceeds 1. Also, when the constraint is not satisfied, the penalty function will provide a penalty greater than 0 and otherwise, no penalty will be levied (e.g. the output of the penalty function is 0).
      ii. Therefore, this constraint can be converted to an equivalent penalty as:

$$\sum_{i=1, U \ge j > i}^{U-1} P(x_{N(i-1)+1} x_{N(j-1)+1})$$

b. The constraint $m_u \le b_{u,k} m_{u,k} + (1-b_{u,k}) m_M$, $\forall u$, $\forall k$ can be transformed as:
      i. We have already expressed $m_u$ in terms of binary variables, the variables $b_{u,k}$ are already binary variables and we know the value of $m_M$ from the input. So, we may convert the inequality constraint into an equality constraint.
      ii. For this, we add a slack variable $s_i$, where $i \in [1, UN]$ on the left-hand side of the inequality and we express the added slack variable in terms of binary variables as we can compute the upper bound and lower bound of the added slack variable from the resultant equation.
      iii. Now, the constraint is in the matrix equation form and we follow the procedure mentioned above to add the equivalent quadratic penalty to the energy function.
3. We follow the above steps 5 & 6 to determine the Q matrix, and its size will be $[UN+U([\log_2 m_M]+1)+UN([\log_2 m_M]+1)] \times [UN+U([\log_2 m_M]+1)+UN([\log_2 m_M]+1)]$, in general.

Thus, in particular examples of the method 100, the method may further comprise defining an integer linear programming (ILP) problem for allocation of wireless resources to a plurality of wireless communication devices in a wireless network. The ILP problem may comprise for example the objective function defined above and also the constraints in some examples. Determination of allocation of resources for a plurality of wireless communication devices in the wireless network as a quadratic unconstrained binary optimization (QUBO) problem may expressing the ILP problem as the QUBO problem. In some examples, the ILP problem comprises a maximization problem of determining a respective subset of available scheduling units for each of the wireless communication devices so as to maximize a sum of values of a utility function for the plurality of wireless devices, wherein the value of the utility function for a wireless device indicates a throughput for that wireless device for the respective subset of available scheduling units, wherein the utility function comprises an objective function for the ILP problem. The value of the utility function for a wireless device for a subset of the available scheduling units may in some examples be based on a maximum modulation and coding scheme throughput for the wireless device for the subset of available scheduling units.

Figure 1B:
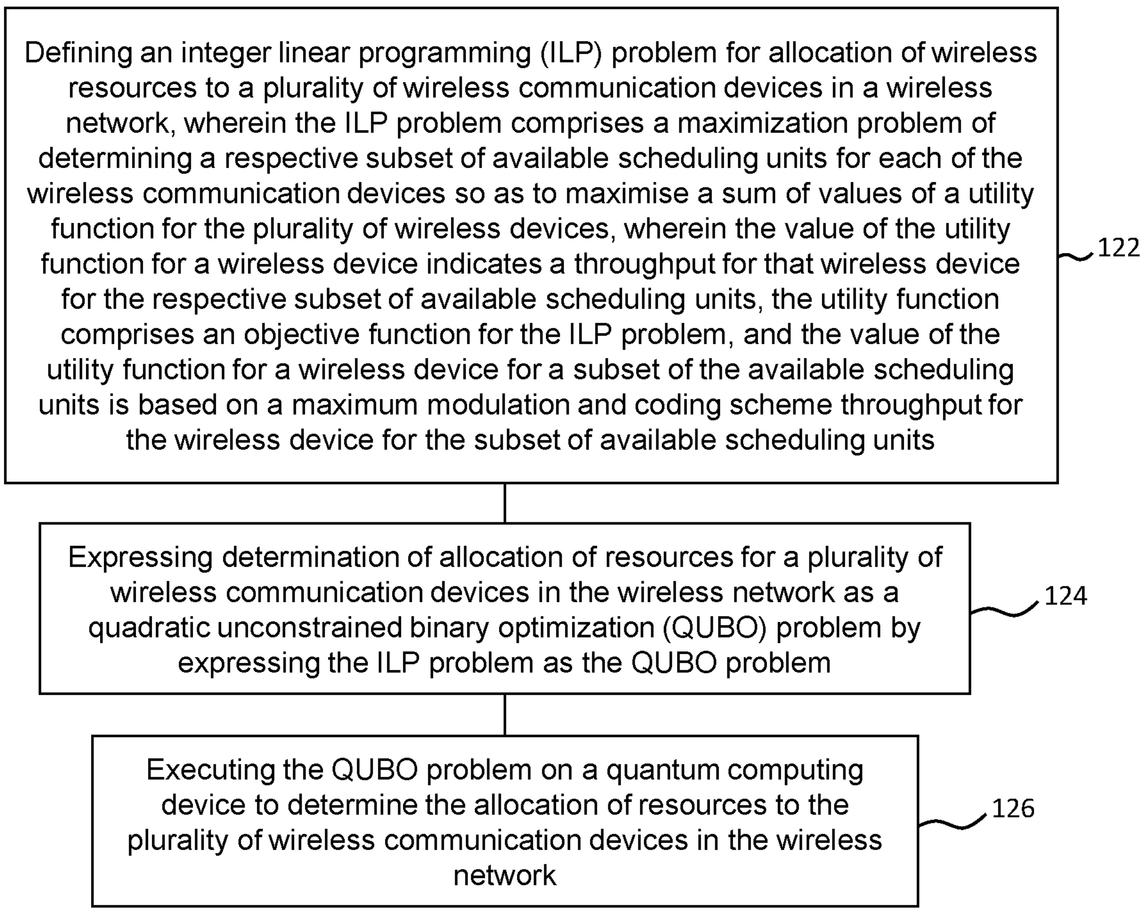
FIG. 1B is a flow chart of another example of a method of determining allocation of resources in a wireless network.

FIG. 1B is a flow chart of another example of a method 120 of determining allocation of resources in a wireless network, illustrating an example of the above. Step 122 of the method 120 comprises defining an integer linear programming (ILP) problem for allocation of wireless resources to a plurality of wireless communication devices in a wireless network, wherein the ILP problem comprises a maximization problem of determining a respective subset of available scheduling units for each of the wireless communication devices so as to maximise a sum of values of a utility function for the plurality of wireless devices, wherein the value of the utility function for a wireless device indicates a throughput for that wireless device for the respective subset of available scheduling units, the utility function comprises an objective function for the ILP problem, and the value of the utility function for a wireless device for a subset of the available scheduling units is based on a maximum modulation and coding scheme throughput for the wireless device for the subset of available scheduling units. Step 124 of the method 120 comprises expressing determination of allocation of resources for a plurality of wireless communication devices in the wireless network as a quadratic unconstrained binary optimization (QUBO) problem by expressing the ILP problem as the QUBO problem. Step 126 of the method 120 comprises executing the QUBO problem on a quantum computing device to determine the allocation of resources to the plurality of wireless communication devices in the wireless network.

In some examples of the method 100 or 120, the maximum modulation and coding scheme throughput for the wireless device for the subset of available scheduling units is selected from a $$\text{matrix } \mathcal{J} = \begin{bmatrix} m_{u_1,k_1} & \cdots & m_{u_1,k_N} \\ \vdots & \ddots & \vdots \\ m_{u_U,k_1} & \cdots & m_{u_U,k_N} \end{bmatrix},$$

wherein $m_u$,k indicates a maximum modulation and coding scheme throughput for wireless device u (e.g. in a particular time period such as a TTI) and scheduling unit k, $u=u_1, \dots, u_U$ and $k=k_1, \dots, k_N$. The ILP problem may in some examples be a problem to maximise $\sum_{u\in\mathcal{U}}\varphi_u(k\in\mathcal{N}\,b_{u,k}=1,m)$, where $\mathcal{U}$ is a set comprising the plurality of wireless communication devices $\mathcal{N}$ is a set of available scheduling units, $\varphi_u$ is the utility function for wireless device u, $m_u$ indicates a maximum modulation and coding scheme throughput for the wireless device for the subset of available scheduling units where $k\in\mathcal{N}|b_{u,k}=1$, and $b_{u,k}$ is a binary variable that is 1 if scheduling unit k is allocated to wireless device u and a value other than 1 if scheduling unit k is not allocated to the wireless device u.

The utility function may for example include one or more constraints including a first constraint whereby each available scheduling unit may be allocated to a maximum of one UE, and/or a second constraint whereby each wireless device may use a single modulation and coding scheme for the subset of available scheduling units. $b_{u,k}$, $u=u_1, \ldots, u_U$, $k=k_1, \ldots, k_N$ may indicate a solution to the ILP problem.

Expressing the ILP problem as the QUBO problem in some examples may comprise the following steps:

- negating coefficients of the objective function of the ILP problem;
- converting the objective function of the ILP problem into an expression containing only binary variables;
- transforming one or more constraints of the objective function into an unconstrained form using quadratic penalty functions, including converting any constraints in the form of linear inequalities to a general matrix equation form Ax=b, where A is a matrix containing coefficients of binary variables in the column vector x, and b is a column vector containing the constants in the system of linear equations, wherein the first constraint comprises $\Sigma_u\, b_{u,k}\leq 1$, $\forall k\in\mathcal{N}$ and/or the second constraint comprises $m_u\leq b_{u,k}m_{u,k}+(1-b_{u,k})m_M$, ∀u, ∀k;
- combining the expression containing only binary variables and the penalty functions into a single quadratic expression equivalent to the form $x^TQx$; and
- determining the matrix Q from the quadratic expression.

The binary variables in the expression containing only binary variables may represent logical qubits in a problem graph for the quantum computing device.

The utility function may for example comprise $\varphi_u(\mathcal{N}_u, m_u)=|\mathcal{N}_u|\times\text{index}(m_u)$. Converting the objective function of the ILP problem into the expression containing only binary variables may then comprise mapping $b_{u_i,k_j}\to x_{N(i-1)+j}$, where $i\in[1, U]$ and $j\in[1,N]$ to obtain UN binary variables $x_1$ to $x_{UN}$, wherein N is the number of wireless devices and N is the number of available scheduling units. In some examples, $\Sigma_k b_{u,k}\leq 1$, $u\in\mathcal{U}$.

Converting the objective function of the ILP problem into the expression containing only binary variables may comprise for example expressing each $m_u$ as one of the binary variables. For example, the expression suggested above for conversion into binary variables may be used. The method 100 may in some examples comprise transforming the constraint $\Sigma_u\, b_{u,k}\leq 1$, $\forall k\in\mathcal{N}$ to a quadratic penalty function, $$\sum\nolimits_{i=1,U\geq j>i}^{U-1}P(x_{N(i-1)+1}x_{N(j-1)+1}).$$

In some examples, transforming the inequality constraint $m_u\leq b_{u,k}m_{u,k}+(1-b_{u,k})m_M$, ∀u, ∀k to a quadratic penalty function comprises:

- adding a slack variable $s_i$, $i\in[\mathbf{1}, \text{UN}]$ to the left side of the inequality constraint and expressing slack variable in terms of binary variables to convert the inequality constraint to a matrix equation form; and
- converting the matrix equation form to a quadratic penalty function using the term $(Ax-b)^2$.

Once allocation of the resources in the wireless network is determined, the method 100 may comprise allocating the resources in the wireless network according to a result of executing the QUBO problem on the quantum computing device. Alternatively, the allocation may be sent to another network node that performs the allocation of resources.

A particular worked example of expressing an ILP problem as a QUBO problem will now be described. Consider a wireless network with two UEs (wireless devices) and two scheduling units (SUs), for example in one TTI. In this example the most efficient MCS index that UE 1 can use in SU 1 is 3, and in SU 2 is 1. The most efficient MCS index that UE 2 can use in SU 1 is 4, and in SU 2 is 2.

The problem instance matrix is $I=(m_{u,k})_{u,k}$:

$$I=(m_{u,k})_{u\in U,k\in N}=\begin{bmatrix}3 & 1\\ 4 & 2\end{bmatrix}$$

For example, on selecting a single MCS, the UE 1 needs to select either 3 or 1 whereas the UE 2 needs to select either 4 or 2. This selection for an MCS for each UE depends on the SUs allocated to that UE. For instance, assume that UE 1 is allocated with both SU 1 and SU 2 and UE 2 is not allocated with any of the SUs. Then, UE 1 will select the MCS index 1 as the UE needs to select the minimum MCS index for all allocated SUs as described above (e.g. because the UE cannot transmit or receive at a higher MCS in certain SUs).

The most optimal solution has a utility value φ=5. Here, two solutions are possible.

Solution 1

UE 1 is assigned with SU1 (MCS index 3), UE 2: SU2 (MCS index 2)

Utility value: (1×3)+(1×2)=5

Solution 2

UE 1: SU2 (mcs index 1), UE 2: SU1 (mcs index 4)

Utility value: (1×1)+(1×4)=5

The next most optimal solution has a utility value, φ=4.

UE 1: Φ (nothing assigned), UE 2: SU1, SU2 (MCS index 2 by selecting the min{4, 2})

Utility value: 0+(2×2)=4

The steps followed to express the determination of allocation of resources for a plurality of wireless communication devices in the wireless network problem as a quadratic unconstrained binary optimization (QUBO) problem are as follows.

1. Mapping the binary variables:

$$b_{u_1,k_1}\to x_1$$

$$b_{u_1,k_2}\to x_2$$

$$b_{u_2,k_1}\to x_3$$

$$b_{u_2,k_2}\to x_4$$

2. Objective:

$$\text{Maximize}\sum_{u\in U}\varphi(\{k\in N\,|\,b_{u,k}=1\},m_u).$$

Utility function: $\varphi(\mathcal{N}_u, m_u)=|\mathcal{N}_u|\times\text{index}(m_u)$ The objective function is then written as, $$\text{Maximize} \sum_u\left(\left(\sum_k b_{u,k}\right)\times(m_u)\right),\ u\in\mathcal{U},\ k\in N$$

Here, $m_u\in\{1, 2, 3, 4\}$ with $m_M=4$.

The objective function can be written using binary variables as, $(x_1+x_2)(1.\ x_5+2.\ x_6+4.\ x_7)+(x_3+x_4)(1.\ x_8+2.\ x_9+4.\ x_{10})$ where $x_i$ is binary variable.

Now, negate all the coefficients of the objective function (to convert maximization problem into minimization problem):

The objective function is, $$(x_1+x_2)(1.x_5+2.x_6+4.x_7)+(x_3+x_4)(1.x_8+2.x_9+4.x_{10}) = x_1x_5+2x_1x_6+4x_1x_7+x_2x_5+2x_2x_6+4x_2x_7+x_3x_8+2x_3x_9+4x_3x_{10}+x_4x_8+2x_4x_9+4x_4x_{10}$$

Negating all the coefficients, we get $$=-x_1x_5-2x_1x_6-4x_1x_7-x_2x_5\text{-}2x_2x_6-4x_2x_7-x_3x_8-2x_3x_9-4x_3x_{10}-x_4x_8-2x_4x_9-4x_4x_{10}$$

3. Constraints:

Constraint 1:

$$\sum_u b_{u,k}\le 1,\ \forall\ k\in N$$

Take $k_1$: $b_{u_1,k_1}+b_{u_2,k_1}\le 1\Rightarrow x_1+x_3\le 1\Rightarrow P(x_1x_3)$ Take $k_2$: $b_{u_1,k_2}+b_{u_2,k_1}\le 1\Rightarrow x_2+x_4\le\mathbf{1}\Rightarrow P(x_2x_4)$ For all k, the penalty will be: $P(x_1x_3)+P(x_2x_4)=P(x_1x_3+x_2x_4)$ Constraint 2:

$$m_u\le b_{u,k}m_{u,k}+(1-b_{u,k})m_M,\forall u,\forall k$$

1. $m_{u_1}\le 3x_1+4(1-x_1)$ for $u_1$, $k_1$ $$\Rightarrow m_{u_1}\le -1x_1+4$$

$$\Rightarrow m_{u_1}+s_1=-1x_1+4$$

$$\Rightarrow P(1\cdot x_5+2\cdot x_6+4\cdot x_7+(1\cdot x_{11}+2\cdot x_{12}+4\cdot x_{13})+x_1-4)^2$$

($m_{u_1}$ and slack variable $s_1$—by calculating its upper bound—are expressed using the binary variables)

2. $m_{u_1}\le 1x_2+4(1-x_2)$ for $u_1$, $k_2$ $$\Rightarrow P(1\cdot x_5+2\cdot x_6+4\cdot x_7+(1\cdot x_{14}+2\cdot x_{15}+4\cdot x_{16})+3x_2-4)^2$$

3. $m_{u_2}$<; $4x_3+4(1-x_3)$ for $u_2$, $k_1$ $$\Rightarrow P(1\cdot x_8+2\cdot x_9+4\cdot x_{10}+(1\cdot x_{17}+2\cdot x_{18}+4\cdot x_{19})+(1\cdot x_3-4)^2$$

4. $m_{u_2}\le 2x_4+4(1\cdot x_4)$ for $u_2$, $k_2$ $$\Rightarrow P(1\cdot x_8+2\cdot x_9+4\cdot x_{10}+(1\cdot x_{20}+2\cdot x_{21}+4\cdot x_{22})+2x_4-4)^2$$

Summing up the constraints (penalty terms) to the objective, we get $$=-x_1x_s-2x_1x_6-4x_1x_7-x_2x_5-2x_2x_6-4x_2x_7\text{-}x_3x_8-2x_3x_9-4x_3x_{10}-x_4x_8-2x_4x_9-4x_4x_{10}$$

$$+P(1\cdot x_5+2\cdot x_6+4\cdot x_7+(1\cdot x_{11}+2\cdot x_{12}+4\cdot x_{13})+x_1-4)^2$$

$$+P(1\cdot x_5+2\cdot x_6+4\cdot x_7+(1\cdot x_{14}+2\cdot x_{15}+4\cdot x_{16})+3x_2-4)^2$$

$$+P(1\cdot x_8+2\cdot x_9+4\cdot x_{10}+(1\cdot x_{17}+2\cdot x_{18}+4\cdot x_{19})+(1\cdot x_3-4)^2$$

$$+P(1\cdot x_8+2\cdot x_9+4\cdot x_{10}+(1\cdot x_{20}+2\cdot x_{21}+4\cdot x_{22})+2x_4-4)^2$$

where P is the Lagrangian multiplier (can be viewed as penalty weightage).

Replace P with appropriate value and expand the expression. This is then the QUBO form of our original problem.

After expanding, place the coefficient of each term in the appropriate place of the Q matrix. For instance, the first term of the resulting expression is $-x_1x_5$. So, place −1 in the $1^{st}$ row and $5^{th}$ column of the Q matrix. This may be similarly performed for all the terms and put 0 in the empty positions of the matrix. This produces the final Q matrix which is of size 22×22 as there are 22 binary variables.

Cross-verification:

We have claimed that the Q matrix will be of size, $$[UN+U([\log_2 m_M]+1)+UN([\log_2 m_M]+1)]\times[UN+U([\log_2 m_M]+1)+UN([\log_2 m_M]+1)]$$

In this example problem,

U=2, N=2, $m_M=4$. Substituting these values, we get:

$$[(2)(2)+2(2+1)+(2)(2)(2+1)]\times[(2)(2)+2(2+1)+(2)(2)(2+1)]=[4+6+12]\times[4+6+12]=22\times 22.$$

The QUBO problem is therefore now complete and may be executed on a quantum computing device such as a quantum annealer.

In a particular implementation, the QUBO form of the resource allocation problem has been formulated using the python package "qubovert". Initially, the objective function is using the methodology disclosed herein, and the appropriate value is calculated for the Lagrangian multiplier which works well for most of the cases, using the coefficients of the objective function. Two different values are used for denoting this weightage of the penalty, as constraint (i) above may need to be satisfied strictly in some examples. A model which holds this objective function is created, and then reformed constraints are added one by one to this model. This results in a Polynomial Unconstrained Binary Optimization (PUBO) form which is a polynomial of degree 3. This PUBO problem is converted to a second-degree polynomial in order to represent this model in QUBO form and make the Q matrix in QUBO as an upper triangular matrix, which may be a requirement to embed the problem in a quantum computing device (e.g. a quantum annealer) and apply quantum annealing. An appropriate value is also determined for the chain strength using the maximum and minimum values of the elements of the Q matrix and it is set such that there will be a small number of chain breaks.

For comparing the performance of our quantum annealing approach of solving this resource allocation problem with classical methods, three different metaheuristic algorithms are used along with the quantum approach, and the runtime of the annealing process is compared.

The implemented algorithms are:

1. Qubovert's simulated annealing (Classical method 1)
2. D-Wave's simulated annealer (Classical method 2)
3. D-Wave's quantum annealer (DW_2000Q)
4. Leap's hybrid solver (Classical+Quantum)

As the number of binary variables in the QUBO form of the resource allocation problem instance is very high when the problem size increases and the problem graph is also less sparsely connected, present hardware for quantum computing devices may limit the size of the problem. In an example, the size of the problem graph that can be successfully embedded in a quantum computing device may have the following properties:

a) Number of wireless communication devices (e.g. UEs)=5 b) Number of Scheduling Units=6 where the maximum MCS index is set as 31.

Experiments have been performed by setting the maximum MCS index as 31, number of SUs as 6 and by increasing the number of UEs from 2 to the limiting case of 6 suggested above. Also, the U×N matrix containing the most efficient MCS for each pair of u and k is generated using the random number generation function within the range as [0, 31] for the purpose of the experiments.

Figure 2:
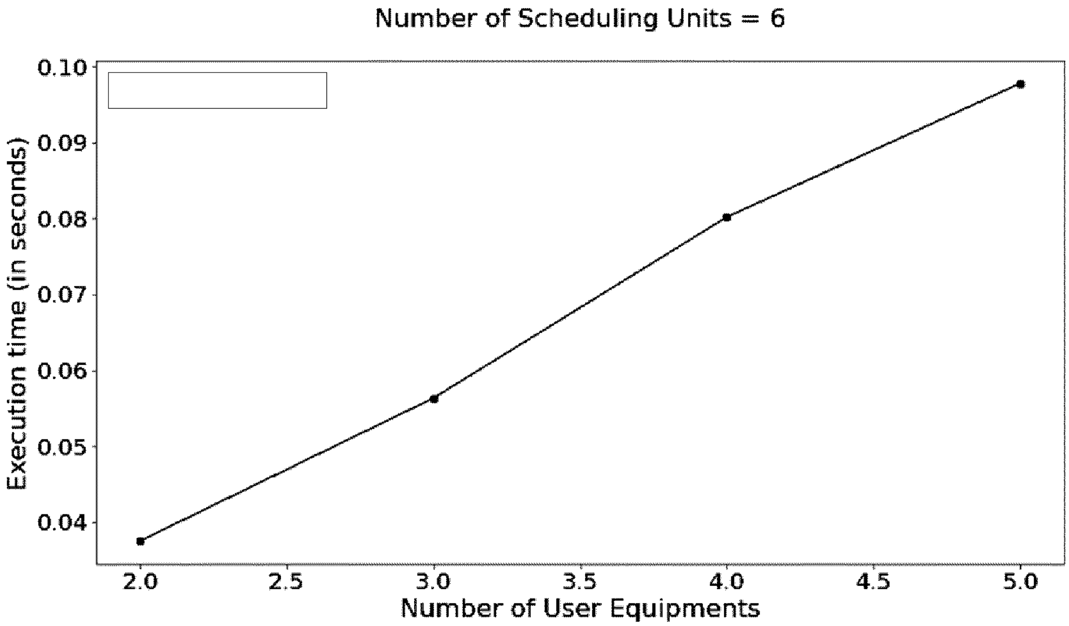
FIG. 2 shows a graph of an example of the execution time to complete one anneal in a simulation of an annealing process.

For algorithm 1 (Classical method 1), the PUBO constructed in the process of forming the QUBO form of resource allocation problem instance was used for qubovert's simulated annealing. FIG. 2 shows an example of the execution time to complete one anneal (qubovert's simulated annealing) to solve the problem when the number of UEs is increased.

Figure 3:
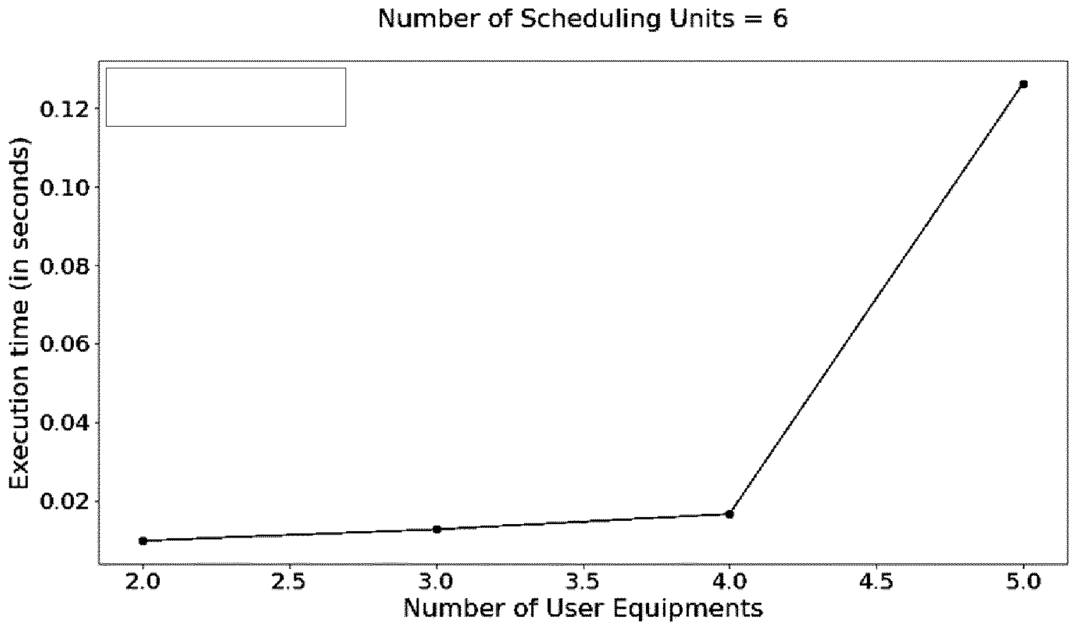
FIG. 3 shows a graph of an example of the execution time to complete one anneal in another simulation of an annealing process.

For algorithm 2 (Classical method 2), the Binary Quadratic Model (BQM) obtained from the problem instance was given as input to the D-Wave's Simulated Annealing sampler and the execution time vs number of UEs is shown in FIG. 3.

For algorithm 3 (Quantum), this approach is used by embodiments of this disclosure to solve the resource allocation problem. The inputs given to the quantum computing device (e.g. quantum annealer) are the QUBO form of the problem and the chain strength value. The experiment is performed on the D-Wave quantum processing unit (DW_2000Q_6) with following configuration:

a) Number of qubits: 2041 b) Qubit temperature (mK): 13.5±1

Figure 4:
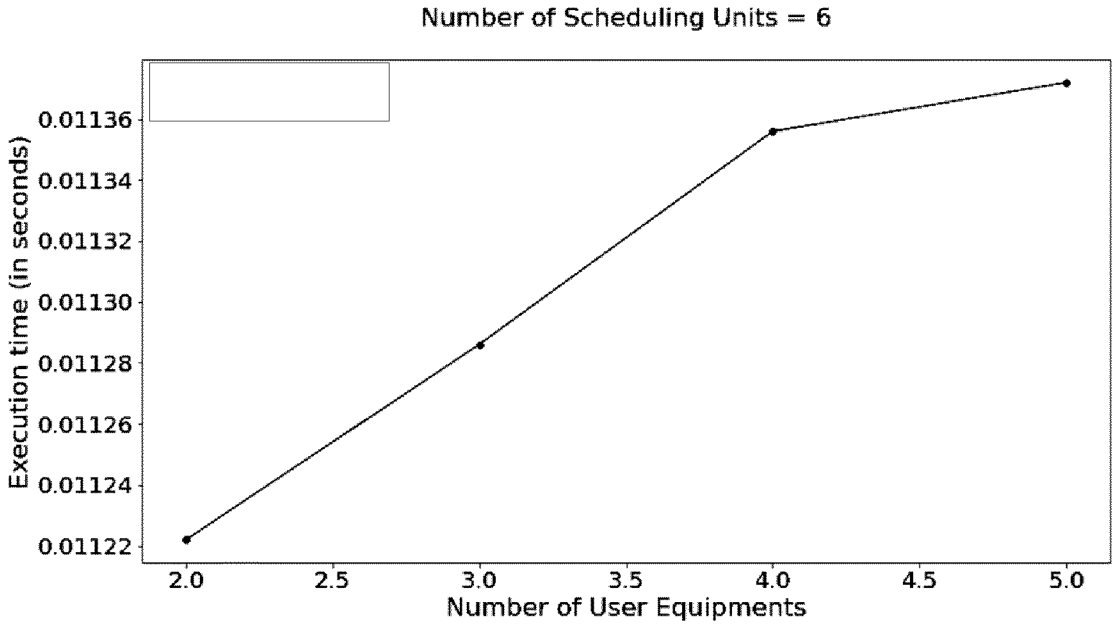
FIG. 4 shows a graph of an example of the execution time to complete one anneal in a quantum execution of an annealing process.

The experimental result obtained is shown in FIG. 4, which plots the QPU access time when the number of UEs is varied.

Figure 5A:
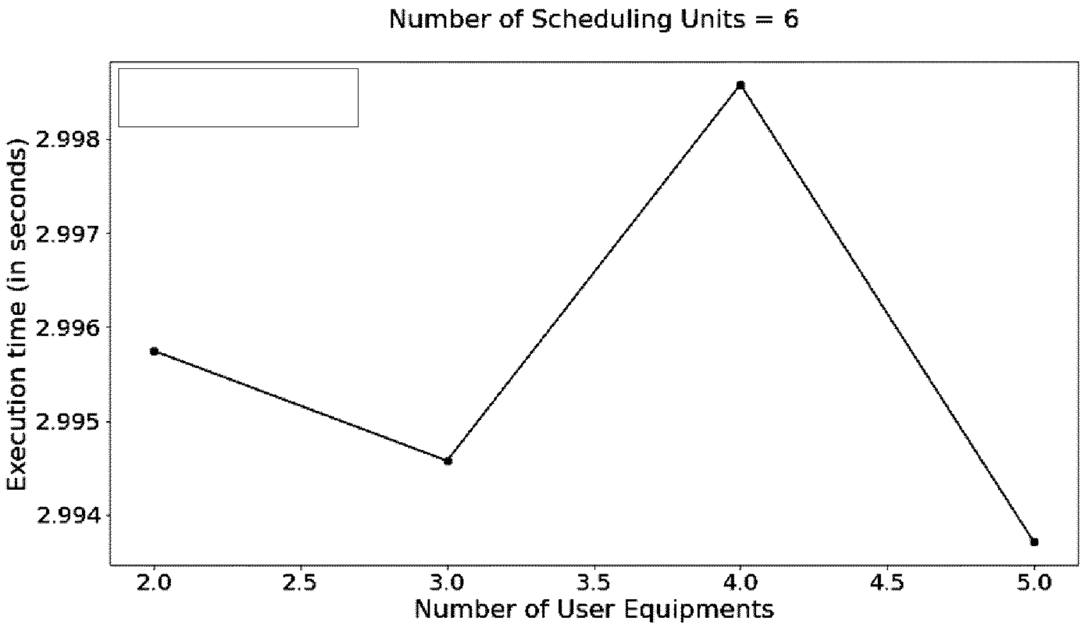
FIGS. 5A and 5B show graphs of an example of the execution time to complete one anneal in a further simulation of an annealing process.
Figure 5B:
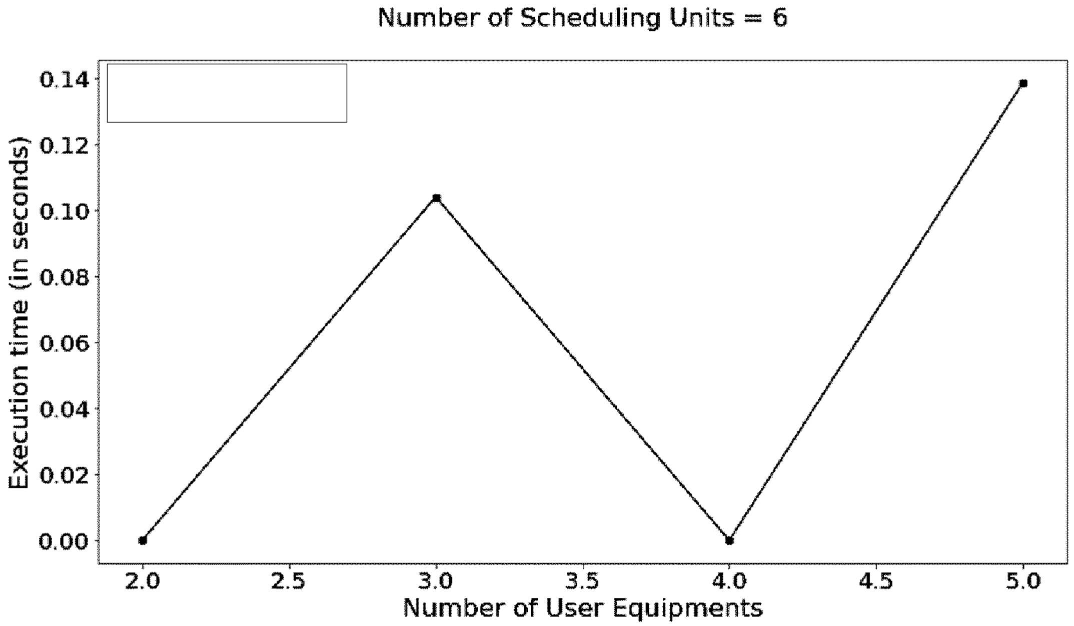

For algorithm 4 (Hybrid), the Leap's cloud-based quantum-classical hybrid sampler was used to solve the problem, and the results are shown separately in FIG. 5A for the total runtime and in FIG. 5B for the quantum processing unit access time.

Figure 6:
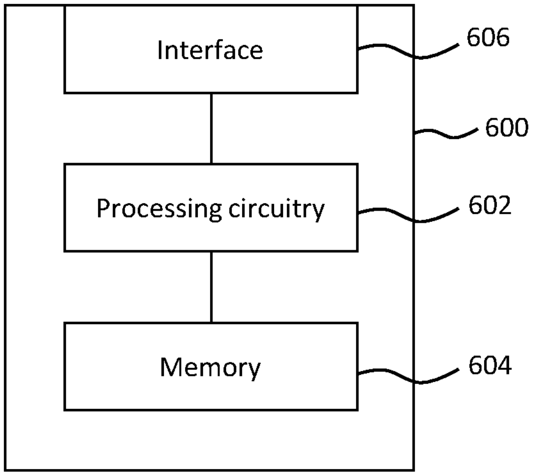
FIG. 6 is a schematic of an example of an apparatus for determining allocation of resources in a wireless network.

FIG. 6 is a schematic of an example of an apparatus 600 for determining allocation of resources in a wireless network. The apparatus 600 comprises processing circuitry 602 (e.g. one or more processors) and a memory 604 in communication with the processing circuitry 602. The memory 604 contains instructions executable by the processing circuitry 602. The apparatus 600 also comprises an interface 606 in communication with the processing circuitry 602. Although the interface 606, processing circuitry 602 and memory 604 are shown connected in series, these may alternatively be interconnected in any other way, for example via a bus.

In one embodiment, the memory 604 contains instructions executable by the processing circuitry 602 such that the apparatus 600 is operable to express determination of allocation of resources for a plurality of wireless communication devices in the wireless network as a quadratic unconstrained binary optimization (QUBO) problem, and execute the QUBO problem on a quantum computing device to determine the allocation of resources to the plurality of wireless communication devices in the wireless network. In some examples, the apparatus 600 is operable to carry out the method 100 described above with reference to FIG. 1.

It should be noted that the above-mentioned examples illustrate rather than limit the invention, and that those skilled in the art will be able to design many alternative examples without departing from the scope of the appended statements. The word "comprising" does not exclude the presence of elements or steps other than those listed in a claim, "a" or "an" does not exclude a plurality, and a single processor or other unit may fulfil the functions of several units recited in the statements below. Where the terms, "first", "second" etc. are used they are to be understood merely as labels for the convenient identification of a particular feature. In particular, they are not to be interpreted as describing the first or the second feature of a plurality of such features (i.e. the first or second of such features to occur in time or space) unless explicitly stated otherwise. Steps in the methods disclosed herein may be carried out in any order unless expressly otherwise stated. Any reference signs in the statements shall not be construed so as to limit their scope.

The invention claimed is:

1. A method of determining allocation of resources in a wireless network, the method comprising:

defining an integer linear programming, ILP, problem for allocation of wireless resources to a plurality of wireless communication devices in the wireless network, the ILP problem comprising a maximization problem of determining a respective subset of available scheduling units for each of the wireless communication devices so as to maximise a sum of values of a utility function for the plurality of wireless devices, the value of the utility function for a wireless device indicating a throughput for that wireless device for the respective subset of available scheduling units, the utility function comprising an objective function for the ILP problem;

expressing determination of allocation of resources for a plurality of wireless communication devices in the wireless network as a quadratic unconstrained binary optimization, QUBO, problem, comprising expressing the ILP problem as the QUBO problem;

executing the QUBO problem on a quantum computing device to determine the allocation of resources to the plurality of wireless communication devices in the wireless network; and performing or causing a network node to perform the allocation of resources.

2. The method of claim 1, wherein the value of the utility function for a wireless device for a subset of the available scheduling units is based on a maximum modulation and coding scheme throughput for the wireless device for the subset of available scheduling units.

3. The method of claim 2, wherein the maximum modulation and coding scheme throughput for the wireless device for the subset of available scheduling units is selected from a matrix $$\text{matrix } \mathcal{J} = \begin{bmatrix} m_{u_1,k_1} & \cdots & m_{u_1,k_N} \\ \vdots & \ddots & \vdots \\ m_{u_U,k_1} & \cdots & m_{u_U,k_N} \end{bmatrix},$$

wherein $m_{u,k}$ indicates a maximum modulation and coding scheme throughput for wireless device u and scheduling unit k, $u=u_1, \ldots, u_U$ and $k=k1, \ldots, k_N$.

4. The method of claim 3, wherein the ILP problem is a problem to maximise Σ_(u∈ $\mathcal{U}$)^ $\mathcal{U}$ φ_u(k∈ $\mathcal{N}$ |b_(u,k)=1, m_u), where $\mathcal{U}$ is a set comprising the plurality of wireless communication devices, $\mathcal{U}$ is a set of available scheduling units, $\varphi_u$ is the utility function for wireless device u, $m_u$ indicates a maximum modulation and coding scheme throughput for the wireless device for the subset of available scheduling units where $k \in \mathcal{U} | b\_(u,k)=1$, and $b_{u,k}$ is a binary variable that is 1 if scheduling unit k is allocated to wireless device u and a value other than 1 if scheduling unit k is not allocated to the wireless device u.

5. The method of claim 4, wherein the utility function includes one or more constraints including one or both of a first constraint whereby each available scheduling unit may be allocated to a maximum of one UE and a second constraint whereby each wireless device may use a single modulation and coding scheme for the subset of available scheduling units.

6. The method of claim 4, wherein $b_{u,k}$, $u=u_1, \ldots, u_U$, $k=k_1, \ldots, k_N$ indicates a solution to the ILP problem.

7. The method of claim 1, wherein expressing the ILP problem as the QUBO problem comprises:

negating coefficients of the objective function of the ILP problem;

converting the objective function of the ILP problem into an expression containing only binary variables;

transforming one or more constraints of the objective function into an unconstrained form using quadratic penalty functions, including converting any constraints in the form of linear inequalities to a general matrix equation form Ax=b, where A is a matrix containing coefficients of binary variables in the column vector x, and b is a column vector containing the constants in the system of linear equations, wherein one or both of: the first constraint comprises $\Sigma_u b_{u,k} \leq 1$, $\forall k \in \mathcal{U}$ and the second constraint comprises $m_u \leq b_{u,k} m_{u,k} + (1-b_{u,k}) m_M$, $\forall u$, $\forall k$;

combining the expression containing only binary variables and the penalty functions into a single quadratic expression equivalent to the form $x^T Q x$;

determining the matrix Q from the quadratic expression;

wherein the binary variables in the expression containing only binary variables represent logical qubits in a problem graph for the quantum computing device.

8. The method of claim 7, wherein converting the objective function of the ILP problem into the expression containing only binary variables comprises expressing each my as one of the binary variables.

9. The method of claim 7, comprising transforming the constraint $\Sigma_u b_{u,k} \leq 1$, $\forall k \in \mathcal{U}$ to a quadratic penalty function $$\sum_{i=1, U \geq j > i}^{U-1} P(x_{N(i-1)+1} x_{N(j-1)+1}).$$

10. The method of claim 7, wherein transforming the inequality constraint $m_u \leq b_{u,k} m_{u,k} + (1-b_{u,k}) m_M$, $\forall u$, $\forall k$ to a quadratic penalty function comprises:

adding a slack variable $s_i$, $i \in [1, UN]$ to the left side of the inequality constraint and expressing slack variable in terms of binary variables to convert the inequality constraint to a matrix equation form; and converting the matrix equation form to a quadratic penalty function using the term $(Ax-b)^2$.

11. The method of claim 1, comprising allocating the resources in the wireless network according to a result of executing the QUBO problem on the quantum computing device.

12. The method of claim 1, wherein executing the QUBO problem on the quantum computing device comprises performing a quantum annealing process.

13. The method of claim 1, wherein the resources in the wireless network comprise resources for wireless communication between the plurality of wireless communication devices and one or more base stations.

14. A non transitory computer readable media having stored thereon a computer program comprising instructions which, when executed on at least one processor, cause the at least one processor to carry out a method of determining allocation of resources in a wireless network, the method comprising:

defining an integer linear programming, ILP, problem for allocation of wireless resources to a plurality of wireless communication devices in the wireless network, the ILP problem comprising a maximization problem of determining a respective subset of available scheduling units for each of the wireless communication devices so as to maximise a sum of values of a utility function for the plurality of wireless devices, the value of the utility function for a wireless device indicating a throughput for that wireless device for the respective subset of available scheduling units, the utility function comprising an objective function for the ILP problem;

expressing determination of allocation of resources for a plurality of wireless communication devices in the wireless network as a quadratic unconstrained binary optimization, QUBO, problem, comprising expressing the ILP problem as the QUBO problem;

executing the QUBO problem on a quantum computing device to determine the allocation of resources to the plurality of wireless communication devices in the wireless network; and performing or causing a network node to perform the allocation of resources.

15. An apparatus for determining allocation of resources in a wireless network, the apparatus comprising a processor and a memory, the memory containing instructions executable by the processor such that the apparatus is operable to:

define an integer linear programming, ILP, problem for allocation of wireless resources to a plurality of wireless communication devices in the wireless network, the ILP problem comprising a maximization problem of determining a respective subset of available scheduling units for each of the wireless communication devices so as to maximise a sum of values of a utility function for the plurality of wireless devices, the value of the utility function for a wireless device indicating a throughput for that wireless device for the respective subset of available scheduling units, the utility function comprising an objective function for the ILP problem;

express determination of allocation of resources for a plurality of wireless communication devices in the wireless network as a quadratic unconstrained binary optimization, QUBO, problem, comprising expressing the ILP problem as the QUBO problem;

execute the QUBO problem on a quantum computing device to determine the allocation of resources to the plurality of wireless communication devices in the wireless network; and perform or cause a network node to perform the allocation of resources.

16. The apparatus of claim 15, wherein the value of the utility function for a wireless device for a subset of the available scheduling units is based on a maximum modulation and coding scheme throughput for the wireless device for the subset of available scheduling units.

17. The apparatus of claim 16, wherein the maximum modulation and coding scheme throughput for the wireless device for the subset of available scheduling units is selected from a matrix $$\text{matrix } \mathcal{J} = \begin{bmatrix} m_{u_1,k_1} & \cdots & m_{u_1,k_N} \\ \vdots & \ddots & \vdots \\ m_{u_U,k_1} & \cdots & m_{u_U,k_N} \end{bmatrix},$$

wherein $m_{u,k}$ indicates a maximum modulation and coding scheme throughput for wireless device u and scheduling unit k, $u=u_1, \ldots, u_U$ and $k=k1, \ldots, k_N$. The method of claim 3, wherein the ILP problem is a problem to maximise Σ_(u∈ $\mathcal{U}$)^$\mathcal{U}$ φ_u(k∈ $\mathcal{N}$ |b_(u,k)=1, m_u), where $\mathcal{U}$ is a set comprising the plurality of wireless communication devices, $\mathcal{U}$ is a set of available scheduling units, $\varphi_u$ is the utility function for wireless device u, $m_u$ indicates a maximum modulation and coding scheme throughput for the wireless device for the subset of available scheduling units where k∈ $\mathcal{U}$ |b_(u,k)=1, and $b_{u,k}$ is a binary variable that is 1 if scheduling unit k is allocated to wireless device u and a value other than 1 if scheduling unit k is not allocated to the wireless device u.

18. The method of claim 17, wherein the ILP problem is a problem to maximise Σ_(u∈ $\mathcal{U}$)^$\mathcal{N}$ φ_u(k∈ $\mathcal{N}$ |b_(u,k)=1, m_u), where $\mathcal{U}$ is a set comprising the plurality of wireless communication devices, $\mathcal{N}$ is a set of available scheduling units, $\varphi_u$ is the utility function for wireless device u, $m_u$ indicates a maximum modulation and coding scheme throughput for the wireless device for the subset of available scheduling units where k∈ $\mathcal{N}$ |b_(u,k)=1, and $b_{u,k}$ is a binary variable that is 1 if scheduling unit k is allocated to wireless device u and a value other than 1 if scheduling unit k is not allocated to the wireless device u.

19. The apparatus of claim 18, wherein the utility function includes one or more constraints including one or both of a first constraint whereby each available scheduling unit may be allocated to a maximum of one UE and a second constraint whereby each wireless device may use a single modulation and coding scheme for the subset of available scheduling units.

20. The apparatus of claim 18, wherein $b_{u,k}$, $u=u_1, \ldots, u_U$, $k=k_1, \ldots, k_U$ indicates a solution to the ILP problem.

* * * * *